United States Patent

[11] 3,548,701

| [72] | Inventor | Paul A. Martin<br>East Aurora, N.Y. |
|---|---|---|
| [21] | Appl. No. | 836,536 |
| [22] | Filed | June 25, 1969 |
| [45] | Patented | Dec. 22, 1970 |
| [73] | Assignee | Fisher-Price Toys, Inc.<br>East Aurora, N.Y.<br>a corporation of New York |

[54] TOY PIANO
 11 Claims, 5 Drawing Figs.
[52] U.S. Cl. ................................................. 84/95
[51] Int. Cl. ................................................. G10f 1/06
[50] Field of Search ........................................... 84/94, 95,
96, 97, 98, 99, 100, 101

[56] References Cited
UNITED STATES PATENTS
1,667,078  4/1928  Patten ........................... 84/95

*Primary Examiner*—Richard B. Wilkinson
*Assistant Examiner*—John F. Gonzales
*Attorney*—Cumpston, Shaw & Stephens ABSTRACT: A toy piano has several music box units actuated by pawls and ratchets to play a note of a tune for each advancement. Depression of any of the piano keys moves a member to actuate one of the pawls, and a manually movable cam selects the tune to be played by controlling selective interengagement of one of the pawls with the moving member.

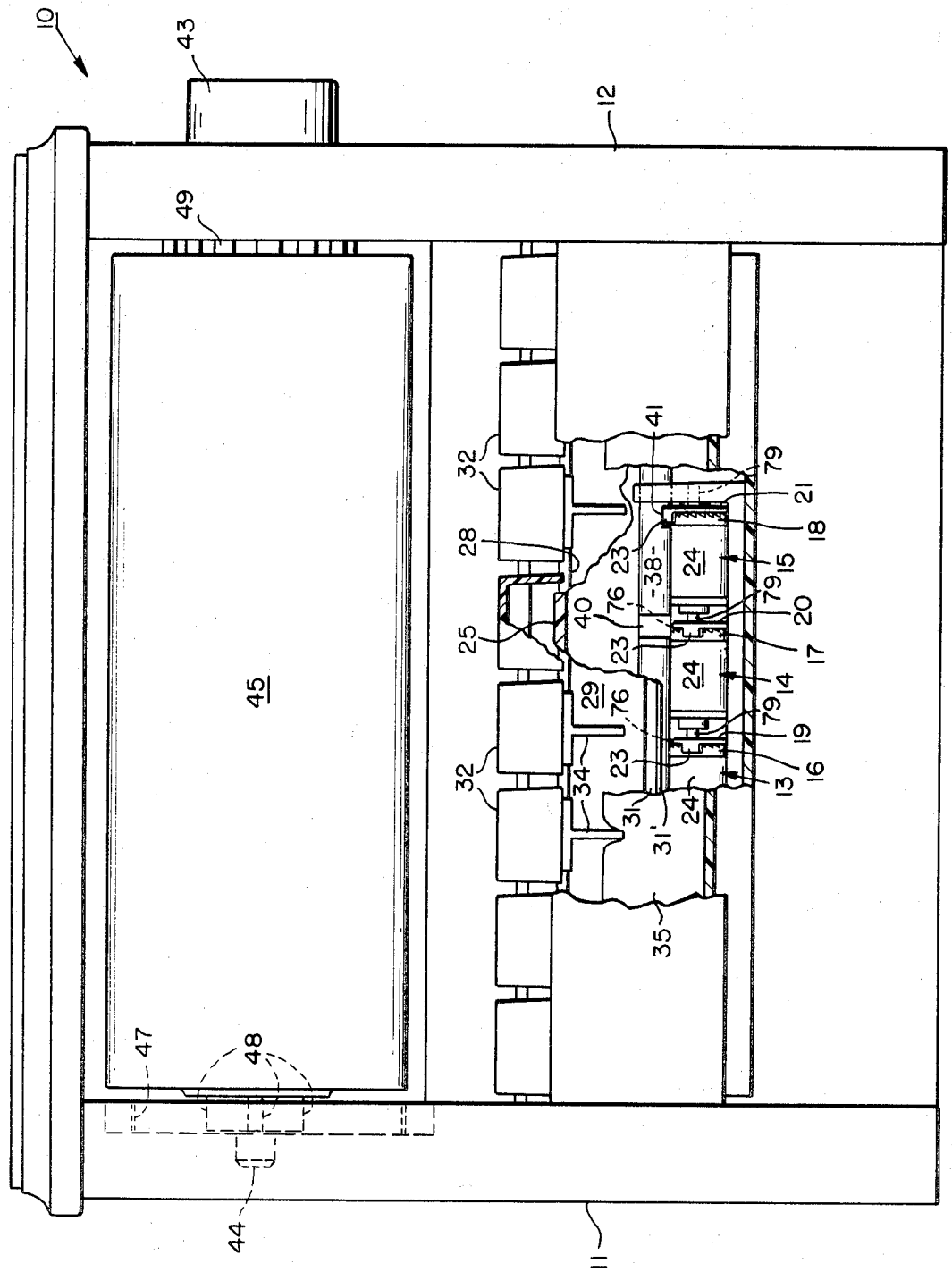

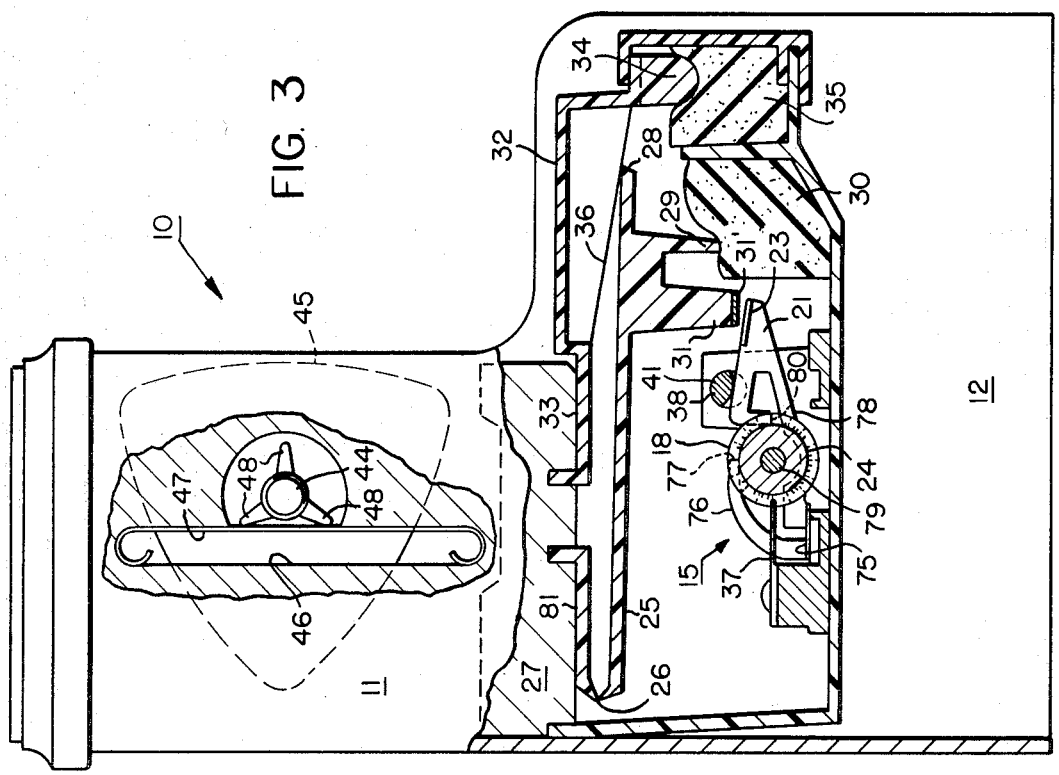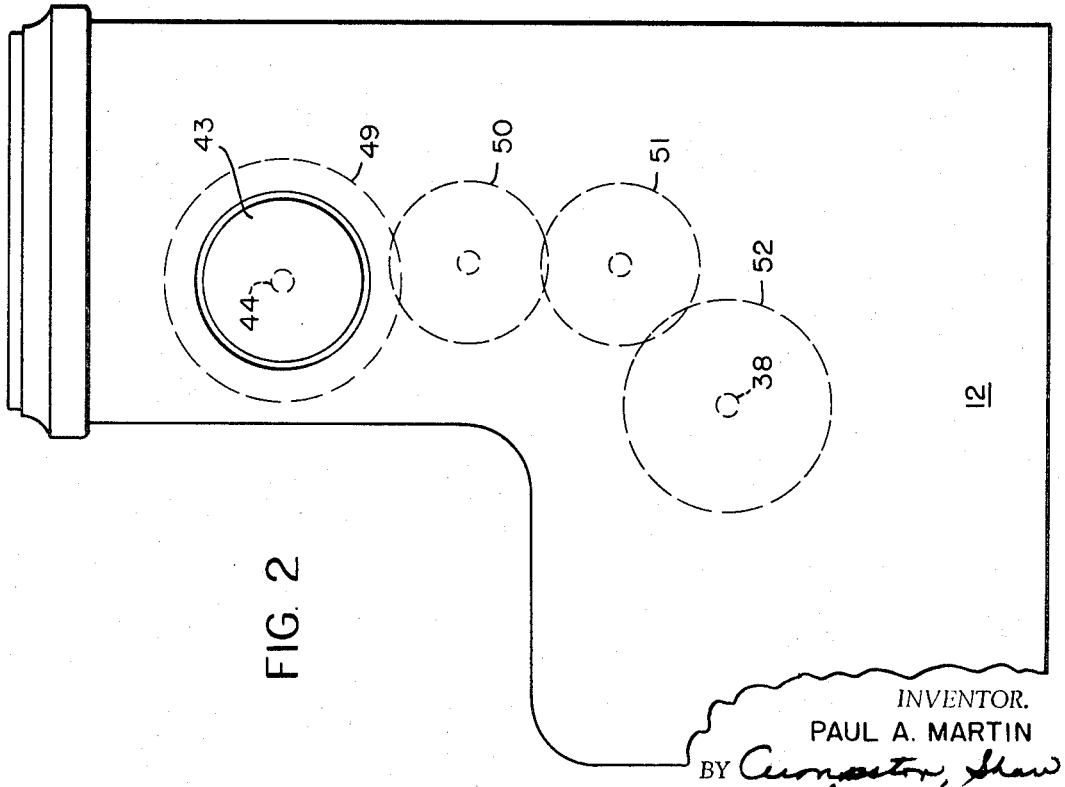

INVENTOR.
PAUL A. MARTIN

ATTORNEYS

TOY PIANO

THE IMPROVEMENT EFFECTED

The invention seeks a more entertaining toy piano offering greater opportunity for manipulation and a more satisfying result form the effort. The invention aims at a simple, economical, and rugged toy piano having keys arranged to advance a music box unit one note for each key depression, and the invention proposes a simple and effective way for arranging several music box units in such a piano so that the tune to be sounded can be manually selected. The inventive toy offers an opportunity for creative musical skill involving ear and hand coordination below the level of ability of real piano playing, but requiring the timing of key strokes to sound several tunes properly.

SUMMARY OF THE INVENTIONS

The objects of the invention are accomplished in a multitune piano having keys arranged to advance the selected tunes one note for each key depression. The music box units are each advanced in stepped rotation by respective pawls and ratchets, and depression of any key moves a member to actuate a selected pawl. The desired tune is selected by manually moving a cam that controls the selective interengagement of one of the pawls with the member moved by the keys. This is preferably accomplished either by a rotatable cam shaft having eccentrics angularly oriented for holding all but one of the pawls in inoperative positions for holding one of a plurality of levers in a position for interengaging with the selected pawl when the key member is moved.

DRAWINGS

FIG. 1 is a partially cutaway front elevational view of a preferred embodiment of the inventive toy piano;

FIG. 2 is a right end elevation of the toy piano of FIG. 1;

FIG. 3 is partially cutaway left end elevation of the toy piano of FIG. 1;

DETAILED DESCRIPTION

Figure 4:
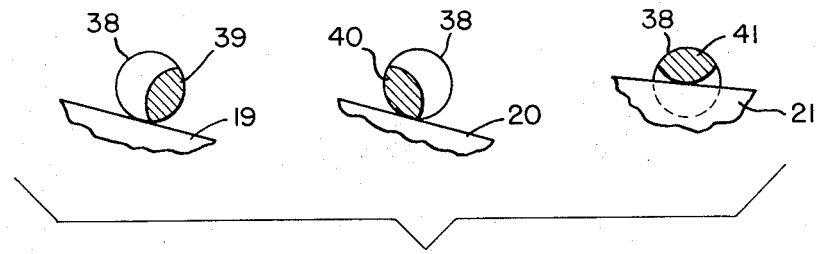
FIG. 4 is an enlarged fragmentary sectional view of different cam and pawl relations for selecting the tune to be played on the toy piano.

Piano 10 of FIGS. 1—4 includes end pieces, 11 and 12 supporting the working mechanism. Three music box units 13—15 are arranged along the same linear axis and each includes a rotatable drum 24 supported on shaft 79 and carrying tunes that pick the fingers of a comb 37. The drums 24 of music box units 13—15 are separately rotatable and driven by respective ratchets 16—18 and pawls 19—21. Each of the pawls 19—21 is formed of resilient material and includes a base 75 secured in place below combs 37. One arm 76 of each pawl extends up to the region of the top of ratchets 16—18 and terminates in a holding tooth 77 for holding ratchets in an advanced position. Another arm 78 of pawls 19—21 extends forward under the shaft 79 supporting drums 24 and terminates in an advancing tooth 80 for advancing the ratchets 16—18 whenever the pawls are depressed. A bent over engaging surface 23 is formed at the forward end of each of the pawls 19—21 for actuating such pawls. The resiliency of the material of pawls 19—21 is such as to bias each of the pawls upward from base 75 and bias each of the teeth 77 and 80 against the notches in ratchets 16—18. Then depression of any of the pawls 19—21 advances ratchets 16—18 clockwise as viewed in FIG. 3, and the tooth 77 of holding pawl 76 holds a ratchet in advanced position as tooth 80 travels upward for a subsequent actuation. Each advancement of ratchets 16—18 plays at least one note of the tune programmed into the drums 24 of music box units 13—15.

The actuation of pawls 19—21 is accomplished by a movable member 25 that is preferably molded of a single piece of resilient plastic to have integral resilient hinge 26. A base 81 of member 25 is secured in place in cross piece 27 extending between end pieces 11 and 12, because of hinge 26, the forward end 28 of member 25 is movable vertically in a pivotal motion. Projection 29 extends downward near the forward region of member 25 and engages foamed resin block 30 that resiliently biases member 25 upward. An actuator bar 31 extends downward from member 25 closely over the engaging surfaces 23 of pawls 19—21 so that when member 25 is depressed, a striker pad 31 on actuator bar 31 engages and depresses one of the pawls 19—21 for advancing one of the music box units 13—15.

A plurality of keys 32 are preferably molded of a single piece of resilient resin material and resiliently joined to an integral base bar 33 secured to cross piece 27 so that keys 32 are individually and resiliently depressable. A projection 34 extends downward at the forward end of each key 32 to engage a resilient block 35 of foamed resin material for biasing each key 32 upward. The under edge 36 of each key 32 engages the forward end 28 of member 25 so that depression of any of the keys 32 depresses member 25.

A cam shaft 38 is arranged for controlling the interengagement of actuator bar 31 of member 25 and pawls 19—21 for selecting the music box unit to be advanced and the tune to be played. Cam shaft 38 is rotatable as described more fully below and has eccentrics 39—41 aligned respectively with pawls 19—21. Eccentrics 39—41 are oriented at angles relative to each other and are preferably arranged as shown in FIG. 4.

Eccentric 41 is elevated relative to pawl 21 to allow pawl 21 to rise to a position form which it can be depressed for actuating music box unit 15. Eccentrics 39 and 40 are each oriented at approximately 120° in opposite directions from eccentrics 41 so that eccentrics 39 and 40 hold respective pawls 19 and 20 down in inoperative positions away from any interengagement with actuator bar 31 of member 25.

With cam shaft 38 in the position illustrated in FIG. 4, depression of one of the keys 32 actuates only pawl 21 to advance only music box unit 15. A 120° turn of cam shaft 38 will elevate eccentric 40 or 39 relative to respective pawl 20 or 19 depending upon the direction of rotation, for selecting another tune to be played. In any of the operating positions of cam shaft 38, only one of the pawls 19—21 is allowed to rise to an operative position for the interengagement with actuator bar 31 of member 25.

Cam shaft 38 is rotated by a manually turnable knob 43 extending outward form end piece 12. Knob 43 is secured to shaft 44 that carries a display 45 visible at the front of piano 10. Display 45 has three faces associated with the three different tunes of music box units 13—15. A slot 46 formed on the inside of end piece 11 carries a spring 47 engaged by detent projections 48 to detent shaft 44 to three 120° angularly spaced positions.

A gear 49 is fixed to shaft 44 and recessed into end piece 12 to mesh with idler gear 50 which meshes with idler gear 51, which in turn meshes with gear 52 fixed to cam shaft 38. Hence, as shaft 44 is turned by knob 43 and positioned by detent projections 48, cam shaft 38 is correspondingly turned to three positions for proper location of its eccentrics 39—41. Turning knob 43 between 120° detent positions changes the face of display 45 and changes the positions of eccentrics 39—41 to select different pawls 19—21 for actuation to play different tunes on piano 10.

Figure 5:
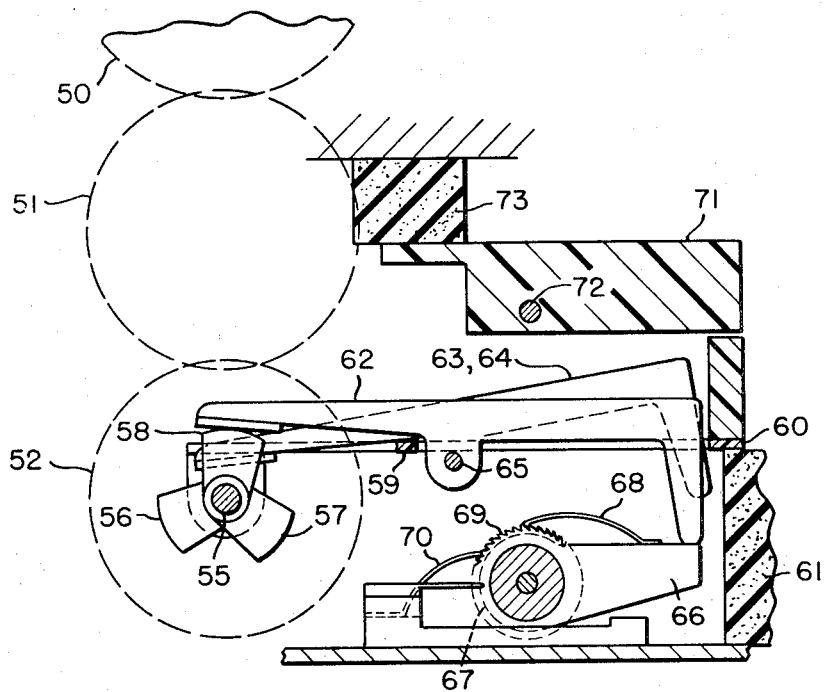
FIG. 5 is a fragmentary elevational view of an alternative drive mechanism for the toy piano of FIG. 1.

FIG. 5 shows an alternative driving arrangement for the inventive toy piano and has many parts in common with the piano of FIGS. 1—4. Idler gears 50 and 51 lead to gear 52 fixed to cam shaft 55 carrying three eccentrics 56—58 angularly oriented 120° from each other. A member 59 is pivotally supported on cam shaft 55 so that its forward end 60 is free for vertical motion. The forward end 60 of member 59 is biased upward by resilient foam block 61. Three levers 62—64 are pivotally mounted on a shaft 65 carried by member 59 and each of the levers 62—64 is aligned with respective pawls 66 of three music box units 67 axially aligned as in toy 10. Pawls 66 are pivotal concentrically with music box units 67 and carry resilient advancing teeth 68 engaging ratchet teeth 69 for each music box unit. A resilient holding pawl 70 also engages each ratchet 69. Keys 71 are pivoted on shaft 72 and biased upward by resilient foam block 73 so that each 71 is individually depressable. All the keys 71 engage the forward end 60 of member 59 when depressed, and depression of member 59 by any of the keys 71 carries levers 62—64 downward toward pawls 66.

At any operative position of cam shaft 55, only one of the eccentrics 56—58 is an upright position to elevate the rear of one of the levers 62—64 and hold down the forward end of such lever so that it engages a pawl 66. Thus, as shown in FIG. 5, eccentric 58 elevates the rear end of lever 62 to force the forward end of lever 62 into engagement with pawl 66 when member 59 is depressed by a key 71. The other two levers 63 and 64 are not engaged by respective eccentrics 56 or 57 and their front ends are not forced to actuate pawls upon depression of member 59. Hence, the rotational position of cam shaft 55 determines which of the pawls 66 will be actuated by depressing a key 71 and which of the tunes from music box units 67 will be selected for play.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, many different arrangements of keys, actuator members, and pawl and ratchet drives for music box units can be used within the spirit of the invention. Also, different levers and linkages are arrangeable in many ways, and other cam shafts, eccentrics, and knob control arrangements can be used for selecting the pawl to be actuated.

I claim:
1. A toy piano comprising:
 a. a plurality of music box units;
 b. a corresponding plurality of ratchets connected in driving relation to each of said music box units;
 c. a corresponding plurality of movable pawls arranged in cooperative relation with said ratchets so that actuation of one of said pawls advances a respective one of said ratchets and said music box units in stepped rotation for sounding a note;
 d. a plurality of depressable keys;
 e. a member arranged to be moved by depression of any one of said keys;
 f. means moved with said member upon depression of one of said keys;
 g. a movable cam;
 h. said cam being arranged for controlling selective interengagement of one of said pawls with said member means upon movement of said member by one of said keys for actuating said selected pawl; and
 i. manually operable means for positioning said cam.

2. The toy of claim 1 wherein said cam comprises a rotatable shaft, and said manually operable means comprises a knob arranged for turning said shaft.

3. The toy of claim 2 including a rotatable display turned with said knob having a face associated with each of said music box units.

4. The toy of claim 3 wherein said knob is coaxial with said rotatable display and said cam shaft is geared to said rotatable display.

5. The toy of claim 2 wherein said cam shaft is formed to define an eccentric aligned with each of said pawls, said eccentrics being oriented at angles relative to each other and configured to hold all but one of said pawls in inoperative positions away from said interengagement with said member means.

6. The toy of claim 5 wherein said eccentrics comprise notches formed in said cam shaft.

7. The toy of claim 2 wherein said member means comprises levers corresponding to each of said pawls and pivotally arranged on said member, and said eccentrics are angularly oriented on said cam shaft to hold one of said levers in a position for said interengagement with said selected pawl.

8. The toy of claim 7 wherein said member is pivotally mounted on said cam shaft.

9. The toy of claim 1 wherein said keys are formed of molded resin and resiliently joined to a single base bar.

10. The toy of claim 9 wherein foamed resin material is disposed to bias said keys upward.

11. The toy of claim 1 wherein said member is a molded resin piece having an integral resilient hinge, and foamed resin material is disposed to bias said member away from said pawls.